US009618357B2

(12) United States Patent
Roelle et al.

(10) Patent No.: US 9,618,357 B2
(45) Date of Patent: Apr. 11, 2017

(54) VEHICLE ASSISTANCE DEVICE

(71) Applicant: Bayerische Motoren Werke Aktiengesellschaft, Munich (DE)

(72) Inventors: Christopher Roelle, Groebenzell (DE); Markus Strassberger, Wartenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/699,656

(22) Filed: Apr. 29, 2015

(65) Prior Publication Data

US 2015/0233727 A1 Aug. 20, 2015

Related U.S. Application Data

(63) Continuation of application No. PCT/EP2013/072144, filed on Oct. 23, 2013.

(30) Foreign Application Priority Data

Oct. 31, 2012 (DE) .......................... 10 2012 219 927

(51) Int. Cl.
*G01C 21/36* (2006.01)
(52) U.S. Cl.
CPC ................................ *G01C 21/3667* (2013.01)
(58) Field of Classification Search
CPC ............ G01C 21/3667; G01C 21/3679; G01C 21/3423; B61L 15/0081; B61L 3/006; G07C 5/008; G05B 19/0428
USPC .................................. 701/19, 427, 533, 1, 2
See application file for complete search history.

(56) References Cited

U.S. PATENT DOCUMENTS

| 5,917,731 A * | 6/1999 | Ferenczi ............ G05B 19/0428 607/27 |
| 2005/0187709 A1* | 8/2005 | Ohdachi ............ G01C 21/3629 701/431 |
| 2007/0203643 A1* | 8/2007 | Ramaswamy ..... G01C 21/3679 701/427 |
| 2008/0177462 A1 | 7/2008 | Yoshioka et al. |

(Continued)

FOREIGN PATENT DOCUMENTS

| CN | 1697963 A | 11/2005 |
| CN | 101228413 A | 7/2008 |

(Continued)

OTHER PUBLICATIONS

International Search Report (PCT/ISA/210) dated Dec. 9, 2013, with English translation (Six (6) pages).
German Search Report dated Jun. 6, 2013, with English translation (Nine (9) pages).
Chinese-language Office Action issued in counterpart Chinese Application No. 201380055669.4 dated Jan. 25, 2016 with English translation (Seventeen (17) pages).

(Continued)

*Primary Examiner* — Yuri Kan
(74) *Attorney, Agent, or Firm* — Crowell & Moring LLP

(57) ABSTRACT

A vehicle assistance device for a driver includes a control unit for generating data that indicates information with respect to the temporal occurrence of an event along a route of a vehicle. A display unit displays a map of the route of the vehicle between a starting point and a destination point of the route. The control unit controls the display unit with data, wherein the control unit generates the data in such a way that the information characterizing the temporal occurrence of an event is displayed on the display unit along the map of the route as a function of the point-in-time of occurrence of the event.

16 Claims, 3 Drawing Sheets

(56) References Cited

U.S. PATENT DOCUMENTS

| | | |
|---|---|---|
| 2008/0234931 A1 | 9/2008 | Wang et al. |
| 2009/0082960 A1* | 3/2009 | Ramaswamy ..... G01C 21/3635 701/431 |
| 2009/0192702 A1 | 7/2009 | Bourne |
| 2010/0136944 A1* | 6/2010 | Taylor .................... B60R 25/00 455/404.1 |
| 2011/0225532 A1 | 9/2011 | Isert et al. |
| 2012/0249456 A1 | 10/2012 | Taka et al. |
| 2013/0018531 A1* | 1/2013 | Kumar .................... B61L 3/006 701/2 |
| 2013/0332004 A1* | 12/2013 | Gompert ................ G07C 5/008 701/1 |
| 2014/0107924 A1* | 4/2014 | Tava .................. G01C 21/3423 701/533 |
| 2015/0168171 A1* | 6/2015 | Tanizaki ............ G01C 21/3461 701/426 |
| 2016/0082989 A1* | 3/2016 | Schoonmaker ..... B61L 15/0081 701/19 |

FOREIGN PATENT DOCUMENTS

| | | |
|---|---|---|
| CN | 101270998 A1 | 9/2008 |
| CN | 102334012 A | 1/2012 |
| CN | 102736778 A | 10/2012 |
| DE | 10 2006 057 919 A1 | 10/2008 |
| DE | 10 2009 011 014 A1 | 9/2010 |
| DE | 10 2009 059 870 A1 | 6/2011 |
| DE | 10 2010 002 741 A1 | 9/2011 |
| DE | 10 2010 038 425 A1 | 1/2012 |
| EP | 2 461 136 A1 | 6/2012 |
| JP | 2007-155404 A | 6/2007 |

OTHER PUBLICATIONS

Chinese Office Action issued in counterpart Chinese Application No. 201380055669.4 dated Sep. 26, 2016 with English translation (20 pages).

* cited by examiner

VEHICLE ASSISTANCE DEVICE

CROSS REFERENCE TO RELATED APPLICATIONS

This application is a continuation of PCT International Application No. PCT/EP2013/072144, filed Oct. 23, 2013, which claims priority under 35 U.S.C. §119 from German Patent Application No. 10 2012 219 927.6, filed Oct. 31, 2012, the entire disclosures of which are herein expressly incorporated by reference.

BACKGROUND AND SUMMARY OF THE INVENTION

The invention relates to a vehicle assistance device for supporting a driver while driving in a vehicle. In addition, the invention relates to a vehicle having such a vehicle assistance device.

Navigation systems today can support a driver with a route preview, taking into account the expected travel time and the predicted traffic volume. When the driver indicates a destination in the navigation system of a vehicle, for example, a detail of the route is displayed on a screen of the navigation system. In addition to the road system, speed restrictions or predicted traffic jams are displayed in particular. In addition, the estimated travel time can be indicated by displaying the expected arrival time at the destination.

The object of the invention is to provide a vehicle assistance device, which will supply information to the driver when driving a route, so that additional information sources may be largely omitted. Another object of the invention is to provide a vehicle with such a vehicle assistance device.

One embodiment of a vehicle assistance device according to the invention includes a control unit for generating data, which provides information with respect to the temporal occurrence of an event along a route of a vehicle and a display unit for displaying a map of the route between a starting point and a destination point of the route. The control unit controls the display unit with the data. The control unit generates the data in such a way that the information characterizing the occurrence of an event is displayed along the map of the route on the display unit as a function of the point-in-time of occurrence of the event.

The vehicle assistance device thus supplies a driver with a schematic diagram of information pertaining to events, of which the control unit estimates that they will occur at a certain time during the trip. The information about the events can be displayed on the display unit in a chronological order of their probable occurrence along a map of the route and provided with time stamps.

These events include, for example, the arrival at, or at least driving by, certain locations at an estimated time, the occurrence of certain traffic conditions, the occurrence of weather conditions at an estimated point-in-time along the route, the occurrence of certain conditions of the vehicle along the route, passing by objects/establishments located along the route, certain traffic rules going into effect along the route and/or the availability or lack of communication service providers as well as radio and television program providers.

The control unit may be designed as a destination/route estimator, which can estimate a destination and the probable route on the basis of available historical information about the driver. On the basis of this destination/route estimator, information that might be relevant for a driver on his trip can be displayed on the display unit. The vehicle assistance device may include an identification unit for recognizing the driver and/or additional occupants of the vehicle. From the multitude of possible information that can be displayed along a route, the control unit can perform individual context-adaptive filtering, taking into account the condition of the vehicle, environmental parameters and driving habits/preferences of the identified driver and/or the additional vehicle occupants identified in the vehicle.

The possible information displayed on the display unit may include, among other things, travel times for various route segments, time loss or delayed arrival times in comparison with "usual" arrival times or appointments from available calendars, for example, a smartphone. Depending on the various appointments or arrivals at different locations, these may be displayed as intermediate route destinations along the map of the route on the display unit. In addition, more extensive details about appointment entries, in particular a group of participants, a location or a starting time and ending time may also be displayed. In addition, various parking opportunities along the route as well as details about the parking opportunities, in particular utilization of capacity, cost, time loss, safety equipment and recommendations/evaluations by other customers may also be displayed on the display unit.

According to another embodiment, the occurrence of a certain weather situation, precipitation intensities, references to snow chain laws, instructions about the possible lack of snow chains in the vehicle, information about toll stations, in particular prices, payment options, probable waiting times or open lanes, predicted rest stops and times, range limits with respect to the available fuel supply and the expected arrival at the last possible gas station in the current country or before a highway, for example, can be displayed. In addition, events detected by sensor units in the vehicle, for example, a dwindling supply of windshield wiper fluid and the nearest opportunity for replenishing the wiper fluid or distant points for maintenance intervals may also be displayed.

Depending on the people in the vehicle, it is possible to display, for example, learned transfer points for car sharing or transfer points to short-range public transportation, for example, park-and-ride sites, locations where friends or acquaintances are staying, for example, rest stops, locations where a driver usually/occasionally stops, comparable locations of the same category, where a driver usually stops as well as details about these locations or locations recommended by friends may be displayed on the display unit. In addition, the positions of vehicles in which friends or acquaintances of the driver are located may also be displayed, which may be advantageous in a joint vacation trip, for example. If other people in the vehicle in addition to the driver have been recognized by the identification unit, then information taking into account the specific interests of the additional occupants may also be displayed. For example, if it is found that there is a small child in the vehicle, then only parking opportunities that permit a barrier-free access at the destination of a route may be displayed.

In addition, traffic rules that have gone into effect may also be displayed along the map of a route on the display unit. At a border crossing, for example, nation-specific details about traffic rules, information about allowed trailer loads, insurance cards, requirements to wear a high visibility vest, toll obligations and the type of fuel in the vehicle may be displayed in the regional language or special speed restrictions, stopping restrictions or parking restrictions may also be displayed. In addition, regions where a certain service is not available may be displayed along the mapped route. This may include a communication service provider, for example, a mobile telephone provider or a radio/television program provider. In addition, regions for which no weather forecast or traffic status prediction has been made available may be displayed.

According to another embodiment, establishments may supply information directly to the vehicle assistance device or to a central office, for example, a back-end of the vehicle manufacturer. This information may then be transmitted from the central office to the vehicle assistance device. The information may characterize a condition of the establishment, for example. If the establishment is a taxi stand or a central car rental office, then information about availability, waiting times, predicted prices or advance reservations may also be displayed on the display unit. If the establishment is an airport, then departure times for booked flights or locations of mobile check-in counters may also be displayed.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
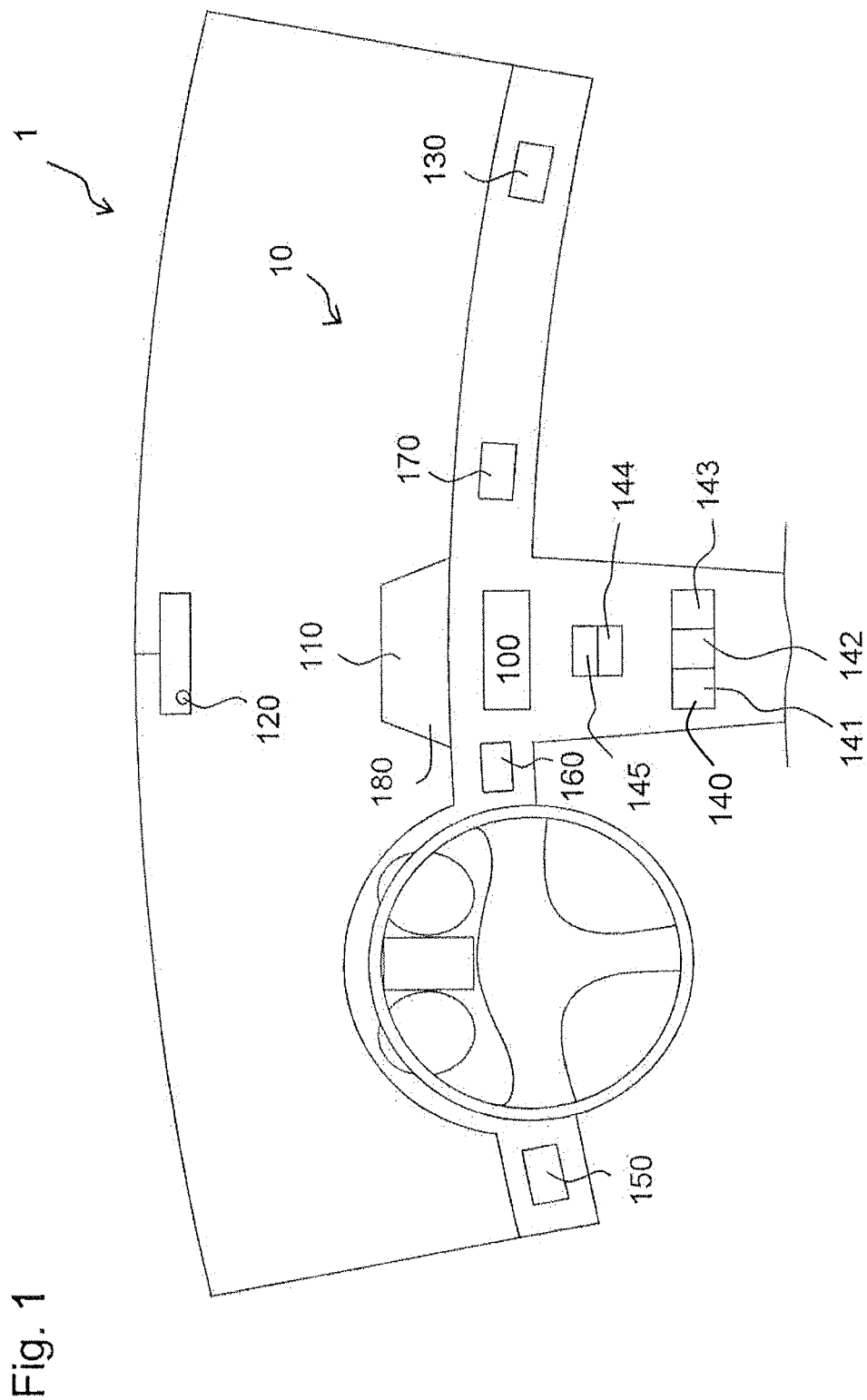
FIG. 1 is a schematic view of an embodiment of a driver assistance device for display of information along a map of a route.

FIG. 1 shows an embodiment of a vehicle (driven) assistance device 10 for display of information along a map of a route, this device 10 being installed in a vehicle 1. The driver assistance device includes a control unit 100 for generating data indicating information with respect to the temporal occurrence of an event along the route. In addition, the driver assistance device 10 has a display unit 110 for displaying a map of a route of the vehicle 1 between a starting point and a destination point of the route. The control unit 100 controls the display unit 110 with the data thus generated. The control unit 100 generates the data in such a way that the information characterizing the occurrence of an event is displayed along the map of the route as a function of the point-in-time of occurrence of the event on the display unit 110.

The information displayed may relate to a reported traffic condition along the route, a reported weather condition along the route, a detected condition of the vehicle along the route, establishments or objects located along the route, events occurring along the route, traffic rules in effect along the route and/or the availability of communication service providers or radio and television providers along the route.

Figure 3:
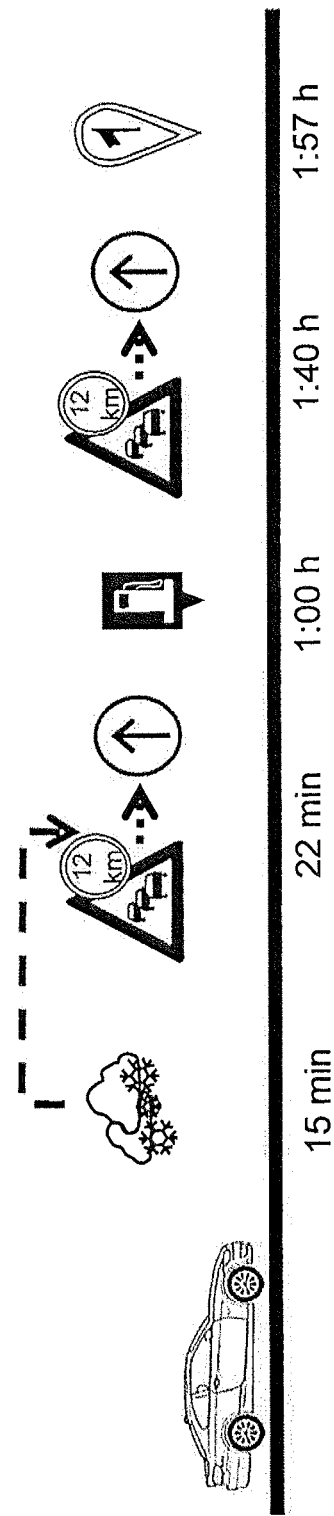
FIG. 3 is an exemplary map of a route with information about the occurrence of events along a route.

The control unit 100 is designed to display the information on the display unit 110 in a chronological order along the map of the route. The occurrence of the predicted events during the trip may be provided with a time stamp. FIG. 3 shows, for example, a route displayed on the display unit 110 between a starting point and a destination point, on which different events are to be expected. In the example of FIG. 3, 15 minutes after leaving the site, for example, snowfall is to be expected according to the available weather information. Because of the snowfall, after approximately 22 minutes, there will be slow-moving or congested traffic for a distance of approximately 12 km. It is estimated that the fuel tank level will gradually dwindle after approximately 1 hour. After 1 hour and 40 minutes, traffic congestion or at least slow-moving traffic can be expected for a distance of 12 km. Arrival at the destination is presumably to be expected after 1 hour and 57 minutes.

The vehicle assistance device 10 may include an identification unit (sensor) 120 for identifying at least one occupant of the vehicle. The control unit 100 may be designed to generate the data as a function of the occupants detected in the vehicle. It is therefore possible to display information of interest for the respective driver or vehicle occupants on the display unit individually for each driver or occupant of the vehicle. Specific information, which can be displayed on the display unit, is therefore assigned to each occupant of the vehicle. The control unit may be designed, in particular, to combine the information for the various vehicle occupants and to resolve any resulting conflicts of interest.

The vehicle assistance device 10 may include a receiving unit 130 for receiving a first data record. The control unit 100 may be designed to generate at least one first portion of the data from the first data record and to display the respective information along the map of the route on the display unit 110. The vehicle assistance device 10 may receive the information displayed on the display unit 110 as a data record, for example, from a central office, for example, a back-end of the automobile manufacturer or directly from various establishments, if the received data record contains information about the transmitting establishment.

The vehicle assistance device 10 may include a memory unit 140 having a memory 141 for storing the first data record received. The control unit 100 may select at least a portion of the data record that contains the information about the specific driver as a function of the identified occupants of the vehicle, in particular the driver, and generate from this information the data indicated by the information.

The vehicle assistance device 10 may additionally have a sensor unit 150 for detecting a condition of the vehicle. The sensor unit 150 generates a second data record as a function of the detected condition of the vehicle. The memory unit 140 may include a second memory 142 for storing the second data record. The control unit 100 is designed to select at least a portion of the second data record as a function of the detected condition of the vehicle and to generate data indicating the information to be displayed from the selected portion of the second data record.

Thus, in addition to information supplied by external establishments, information pertaining to data detected by sensors in one's own vehicle may thus also be displayed along the map of the route. With the route illustrated in FIG. 3, for example, a "gas pump symbol" is displayed after about 1 hour because a tank filling level sensor of the sensor unit has detected that the fuel still present in the tank will approach empty after approximately 1 hour.

The vehicle assistance device 10 additionally has an interface unit 160 for connecting a mobile multifunction unit 2 to the vehicle assistance device 10. The memory unit 140 may have a third memory 143 for storing a third data record. The third data record can be supplied by the mobile multifunction unit 2. The control unit 110 is designed to read out the third data record from the mobile multifunction unit 2 and to store it in the third memory 143. The control unit 100 selects at least one part of the third data record as a function of the route and generates from the selected part of the third data record the data indicating the information for display on the display unit.

The mobile multifunction unit 2 may be a smartphone, for example. The control unit 100 can read out the third data record from a memory of the mobile multifunction unit 2. The memory may contain, for example, entries of an appointment calendar for the driver. The control unit can generate, from the appointments read out, data indicating intermediate route destinations, for example, when it is apparent from the appointment calendar at which locations the appointments take place. If the locations where the appointments take place are located along the route, they can be displayed for the driver as possible intermediate destinations.

According another possible embodiment, the control unit 100 may be designed to be programmable. The control unit 100 can generate the data indicating the information to be displayed as a function of the programming. Thus, the vehicle assistance device 10 makes it possible to adjust the type of information to be displayed to the individual needs of a vehicle occupant. Therefore, individual rules and/or categories pertaining to the information to be displayed can be programmed. For example, a driver can ascertain through the programming whether he will want to have information displayed about parking options along a route, rest spots or park-and-ride parking places with associated short-range public transportation.

In addition, the control unit 110 can be programmed, so that the programming permits filtering of the information to be displayed. For example, if the quantity of possible objects that can be displayed by the control unit along the map of the route exceeds a defined number, the control unit can be programmed, so that certain objects, states or events are not displayed on the display unit. For example, priorities can be assigned to the programmed rules defining the information to be displayed. In addition, the selection of information displayed may be defined as a function of the current context and/or the current driving situation, for example, whether the vehicle is stationary or driving, driving at a certain speed or the complexity of a trip situation. In addition, a degree of detail with which information is displayed on the display unit can be defined by appropriate programming of the control unit 110.

According to another embodiment, the vehicle assistance device 10 includes an input device 180 for input of a trip purpose. The control unit 100 is designed to generate the data that defines the information to be displayed on the display unit as a function of the purpose of the trip that has been input. The information to be displayed can therefore be divided into different context groups, for example, trip to work, vacation trip or shopping trip. Depending on the purpose of the trip, it is thus possible to display different information for the same route, depending on the purpose of the trip. Individual views of the mapped route and the information displayed can be made available to the driver concurrently or in parallel with multiple individual views of the trip mapped and of the information displayed. For example, a vehicle symbol may be shifted along the route displayed, so that it is possible to view in advance the further path guidance.

According to another possible embodiment, a deploying trigger, which indicates why information is being displayed along the mapped route, can be displayed on the display unit 110. If the control unit 110 determines that the vehicle is traveling at a certain time of day on a certain day of the week, for example, on Monday morning around 8:00 a.m., and the identification unit 120 has identified a child on the back seat of the vehicle, then a route between the driver's residence as the starting point and a kindergarten as the destination site will be displayed on the display unit. However, if the identification unit 120 has not detected a child on the back seat, a route between the driver's residence as the starting point and a job site as the destination site will be displayed.

Figure 2:
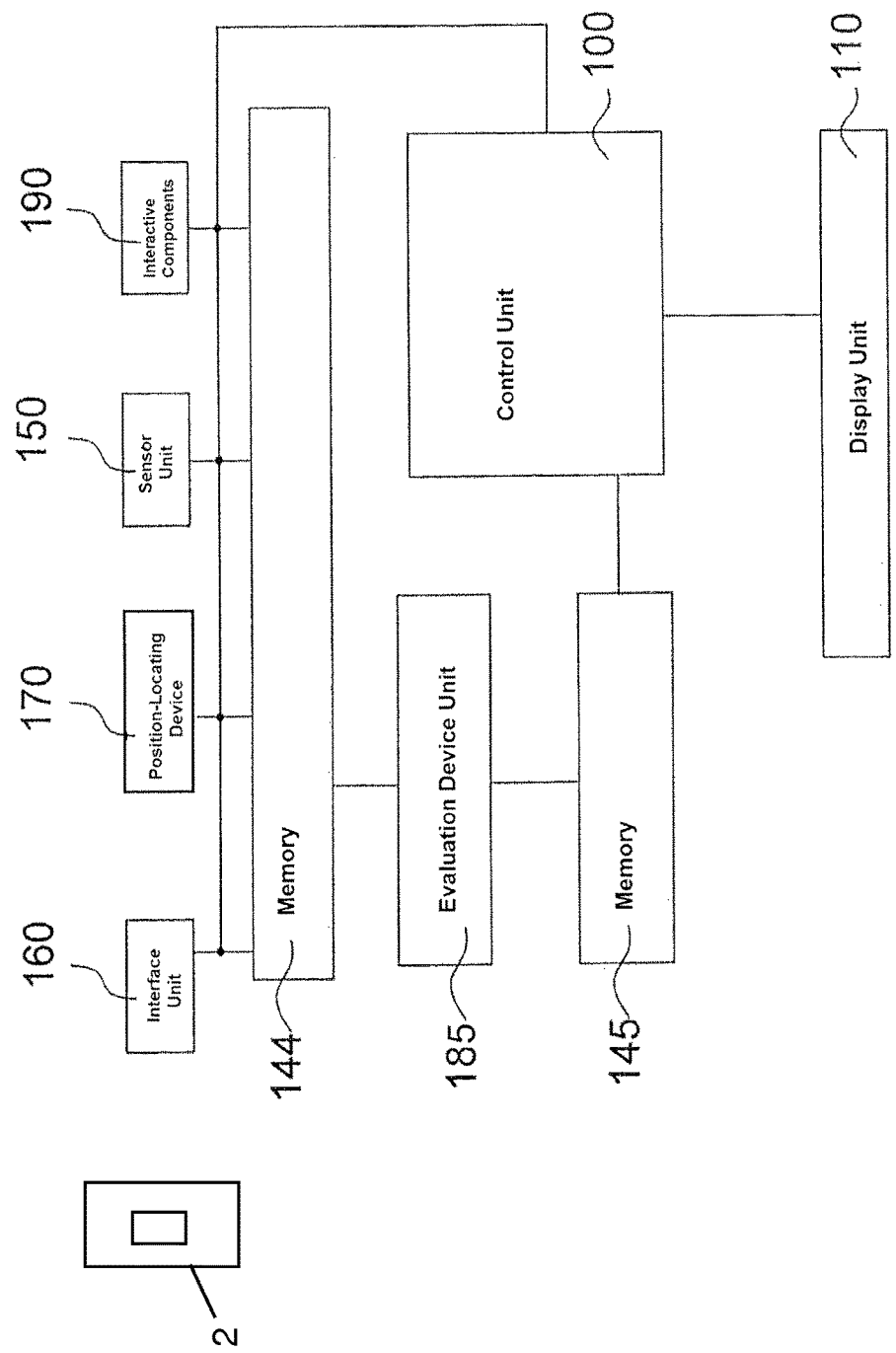
FIG. 2 is a block diagram of another embodiment of a driver assistance device for display of information along a map of a route.

FIG. 2 shows another embodiment of the vehicle assistance device 10, in which the control unit 100 can draw inferences about the route to be displayed and the information to be displayed along the route from the historical driving behavior. The vehicle assistance device 10 includes the control unit 100, the identification unit 120, the sensor unit 150, the interface unit 160, a position-locating device 170 and interaction components 190, for example, a turn indicator. In addition, the vehicle assistance device includes a memory 144 and a memory 145 of the memory unit 140, each for storing a plurality of fourth data records. The fourth data records each comprise a position of the vehicle, a first parameter, which characterizes the occupants of the vehicle, and a second parameter, which characterizes an action of the occupant of the vehicle at the position detected. Thus, a plurality of actions and driving situations are stored in the memory 144 for each driver.

The vehicle assistance device additionally includes an evaluation unit 185 for evaluating the memory 144, such that the evaluation unit 185 stores the fourth data record in the memory 145 as a function of the incidence of storage of the fourth data record in the memory 144. Thus, when the evaluation unit 185 ascertains that the driver identified by the first parameter matches the driver determined by the identification unit 120, and the position contained in the fourth data record lies along the route of the vehicle, then the control unit 100 reads out the fourth data record from the memory 145. The control unit generates the data defining the information to be displayed as a function of the data record read out of the memory 145. The control unit 100 can thus display individual information for a driver as well as generally valid information for any driver along the route mapped on the display unit.

According to another embodiment, additional actions can be assigned to an object displayed along the route mapped. For example, there is the possibility of contacting a merchant, a hotline or a workshop. Detailed information can be displayed about an object that is displayed. If a public short-range transportation company is displayed along the route mapped on the display unit, there is the possibility of paying for a ticket by clicking on the symbol, for example. If the location where a conference is to be held is displayed along the route, then sending a message to a conference participant or contacting the conference partner may be assigned to this object as a more extensive action. In addition, if a toll station is displayed along the route mapped, payment of toll fees electronically by means of the vehicle assistance device may be offered in addition. Furthermore, advance reservation of a parking place can also be offered as an additional option in a parking garage that is displayed.

According to another embodiment, defined events of a trip for a subsequent follow-up consideration and/or processing can be recorded. Events here may include any logical links, in particular the following contents: specific constellation of vehicle data, for example, for subsequent consideration of a trip by vehicle, stopping at specific locations, reaching a certain score in a game, calls received, calls missed, receipt of new messages, for example, via email, Twitter, Facebook or Skype, an accident or a manually triggered event.

Another possibility is to link the recorded events with a selection of associated actions. For example, certain events may be fed into a network, for example, Facebook. In addition, new positions that are of particular interest for the driver can be created and evaluated. An accident report can be examined, the data of the other party to the accident can be retrieved and certain people or establishments can be contacted in this context. In addition, missed calls can be called and messages can be retrieved.

The vehicle assistance device makes available for a driver and/or any of the occupants of the vehicle a central information location for all known requirements that may be of interest and are to be expected during the trip and/or for the next upcoming trips. By adapting this to individual behaviors and needs, a large number of possible information objects at first can be reduced significantly.

LIST OF REFERENCE NUMERALS 1 vehicle
2 mobile multifunction unit
10 vehicle assistance device
100 control unit
110 display unit
120 identification unit
130 receiving unit
140 memory unit
150 sensor unit
160 interface unit
170 position-locating device
180 input device
185 evaluation unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle assistance device, comprising:
    a control unit configured to generate data that indicates information with respect to a first temporal occurrence of a first event and a second temporal occurrence of a second event along a route of a vehicle;
    a display unit for displaying a map of the route of the vehicle between a starting point and a destination point of the route,
    wherein the control unit controls the display unit with the data, and
    wherein the control unit generates the data such that the information characterizing the first and second temporal occurrences of the first and second events are displayed on the display unit along the map of the route as a function of a first point-in-time of the first temporal occurrence of the first event and a second point-in-time of the second temporal occurrence of the second event, wherein the second temporal occurrence of the second event is affected by the first temporal occurrence of the first event.

2. The vehicle assistance device according to claim 1, further comprising:
    an identification unit for identifying at least one occupant of the vehicle;
    wherein the control unit is configured to generate the data as a function of the occupants detected in the vehicle.

3. The vehicle assistance device according to claim 1, wherein the control unit is configured to generate the data as a function of: (i) a condition of the vehicle, (ii) a traffic condition on the route, and/or (iii) a weather condition along the route.

4. The vehicle assistance device according to claim 1, wherein the information relates to one or more of: (i) a reported traffic condition along the route, (ii) a reported weather condition along the route, (iii) a detected condition of the vehicle along the route, (iv) objects located along the route, (v) traffic rules in effect along the route, or (vi) availability of communication service providers, radio and television program providers along the route.

5. The vehicle assistance device according to claim 3, wherein the information relates to one or more of: (i) a reported traffic condition along the route, (ii) a reported weather condition along the route, (iii) a detected condition of the vehicle along the route, (iv) objects located along the route, (v) traffic rules in effect along the route, or (vi) availability of communication service providers, radio and television program providers along the route.

6. The vehicle assistance device according to claim 1, further comprising:
    a receiving unit for receiving a first data record,
    wherein the control unit is configured to generate at least one first portion of the data from the first data record and to display the respective information on the display unit along the map of the route.

7. The vehicle assistance device according to claim 5, further comprising:
    a receiving unit for receiving a first data record,
    wherein the control unit is configured to generate at least one first portion of the data from the first data record and to display the respective information on the display unit along the map of the route.

8. The vehicle assistance device according to claim 1, further comprising:
    at least one sensor unit for detecting at least one condition of the vehicle,
    wherein the sensor unit generates a second data record as a function of the detected condition of the vehicle,
    wherein the memory unit comprises a second memory for storing the second data record,
    wherein the control unit is configured to select at least one portion of the second data record as a function of the detected condition of the vehicle and to generate the data for display on the display unit from the selected portion of the second data record.

9. The vehicle assistance device according to claim 8, further comprising:
    an interface unit for connecting a mobile multifunction unit to the vehicle assistance device,
    wherein the memory unit has a third memory for storing a third data record, and the third data record is supplied by the mobile multifunction unit,
    wherein the control unit is configured to read out the third data record from the mobile multifunction unit and to store it in the third memory of the memory unit,
    wherein the control unit is configured to select at least one portion of the third data record as a function of the route and to generate, from the selected portion of the third data record, the data for display on the display unit.

10. The vehicle assistance device according to claim 9, wherein the mobile multifunction unit is a smartphone, and the control unit is configured to read out the third data record from a memory of the smartphone for storing entries of an appointment calendar of the smartphone.

11. The vehicle assistance device according to claim 9, further comprising:
a position locating device for determining a position of the vehicle,
wherein the memory unit has a fourth memory and a fifth memory, each for storing a plurality of fourth data records, wherein the fourth data records each comprise a position of the vehicle, a first parameter, which characterizes the occupant of the vehicle and a second parameter that characterizes an action of the occupant of the vehicle in that position; and
an evaluation unit for evaluating the fourth memory, such that the evaluation unit stores the fourth data record in the fifth memory as a function of the incidence of the storing of a fourth data record in the fourth memory.

12. The vehicle assistance device according to claim 11, wherein the control unit is configured to read out the fourth data record from the fifth memory when the control unit detects that the driver identified by the first parameter matches the driver determined by the identification unit, and the position contained in the fourth data record lies along the route of the vehicle,
wherein the control unit is configured to generate the data for display on the display unit as a function of the fourth data record selected.

13. The vehicle assistance device according to claim 1, wherein the control unit is programmable, such that the control unit generates the data as a function of the programming.

14. The vehicle assistance device according to claim 1, further comprising:
an input unit for input of a purpose of the trip,
wherein the control unit is configured to generate the data as a function of the purpose entered and to display the respective information on the display unit.

15. The vehicle assistance device according to claim 12, further comprising:
an input unit for input of a purpose of the trip,
wherein the control unit is configured to generate the data as a function of the purpose entered and to display the respective information on the display unit.

16. A vehicle, comprising:
a vehicle assistance device, the vehicle assistance device comprising:
a control unit configured to generate data that indicates information with respect to a first temporal occurrence of a first event and a second temporal occurrence of a second event along a route of a vehicle;
a display unit for displaying a map of the route of the vehicle between a starting point and a destination point of the route,
wherein the control unit controls the display unit with the data, and
wherein the control unit generates the data such that the information characterizing the first and second temporal occurrences of the first and second events are displayed on the display unit along the map of the route as a function of a first point-in-time of the first temporal occurrence of the first event and a second point-in-time of the second temporal occurrence of the second event, wherein the second temporal occurrence of the second event is affected by the first temporal occurrence of the first event.

* * * * *